United States Patent
Seaton

(10) Patent No.: US 9,394,999 B2
(45) Date of Patent: Jul. 19, 2016

(54) SEAL

(71) Applicant: ALSTOM Technology Ltd, Baden (CH)

(72) Inventor: Jonathan David Seaton, Warwickshire (GB)

(73) Assignee: ALSTOM TECHNOLOGY LTD., Baden (CH)

( * ) Notice: Subject to any disclaimer, the term of this patent is extended or adjusted under 35 U.S.C. 154(b) by 0 days.

(21) Appl. No.: 14/864,234

(22) Filed: Sep. 24, 2015

(65) Prior Publication Data

US 2016/0097453 A1    Apr. 7, 2016

(30) Foreign Application Priority Data

Oct. 3, 2014    (EP) .................................... 14187585

(51) Int. Cl.
*F16J 15/447*    (2006.01)
*F16J 15/32*    (2016.01)

(52) U.S. Cl.
CPC .......... *F16J 15/3236* (2013.01); *F16J 15/3268* (2013.01)

(58) Field of Classification Search
CPC ..... F16J 15/445; F16J 15/447; F16J 15/4472; F16J 15/4474; F16J 15/4476; F16J 15/4478; F01D 11/02; F01D 11/025; F01D 11/08
See application file for complete search history.

(56) References Cited

U.S. PATENT DOCUMENTS

| | | | |
|---|---|---|---|
| 997,628 A | 7/1911 | Ljungstroem | |
| 4,443,311 A | 4/1984 | Lichtin et al. | |
| 5,002,288 A | 3/1991 | Morrison et al. | |
| 5,085,443 A | 2/1992 | Richards | |
| 5,603,510 A | 2/1997 | Sanders | |
| 5,810,365 A | 9/1998 | Brandon et al. | |
| 6,000,701 A | 12/1999 | Burgess | |
| 6,022,027 A | 2/2000 | Chevrette et al. | |
| 6,502,823 B1 | 1/2003 | Turnquist et al. | |
| 6,572,115 B1 | 6/2003 | Sarshar et al. | |
| 6,655,696 B1 | 12/2003 | Fang et al. | |
| 6,695,316 B2 | 2/2004 | Popa et al. | |
| 6,786,487 B2 | 9/2004 | Dinc et al. | |
| 7,540,709 B1 * | 6/2009 | Ebert ..................... F04D 29/083 415/173.7 |
| 2009/0196742 A1 | 8/2009 | Turnquist et al. | |

(Continued)

FOREIGN PATENT DOCUMENTS

| DE | 522 872 C | 4/1931 |
|---|---|---|
| DE | 10 2009 003423 A1 | 8/2009 |

(Continued)

OTHER PUBLICATIONS

The extended European Search Report issued on Feb. 16, 2016, by the European Patent Office in corresponding European Patent Application No. 15184151.7-1751. (9 pages).

(Continued)

*Primary Examiner* — Gilbert Lee
(74) *Attorney, Agent, or Firm* — Buchanan Ingersoll & Rooney PC

(57) ABSTRACT

The invention relates to a sealing system for sealing between a first component and a second component wherein at least one or either the first component or the second component is a rotating component. The first component has a circumferential groove in which a sealing segment has first and fifth end portions adjacent the groove and second, third and fourth portions that form a U shape that mirrors the shape of and extends into the circumferential groove.

3 Claims, 1 Drawing Sheet

(56) References Cited

U.S. PATENT DOCUMENTS

| | | |
|---|---|---|
| 2010/0078893 A1 | 4/2010 | Turnquist et al. |
| 2012/0027573 A1 | 2/2012 | Ali et al. |
| 2014/0064909 A1* | 3/2014 | Trivedi ................ F01D 11/001 415/1 |
| 2014/0191475 A1 | 7/2014 | Gupta et al. |
| 2015/0361815 A1* | 12/2015 | Aksit ................ F01D 11/025 415/174.2 |
| 2015/0361816 A1* | 12/2015 | Aksit ................ F01D 11/025 415/174.2 |
| 2015/0369075 A1* | 12/2015 | Nishijima ............ F01D 11/02 415/168.1 |

FOREIGN PATENT DOCUMENTS

| | | |
|---|---|---|
| JP | 61-108808 A | 5/1986 |
| WO | WO 2012/129475 A2 | 9/2012 |

OTHER PUBLICATIONS

Search Report mailed on Apr. 2, 2015, by the European Patent Office for Application No. 14187585.6.

Search Report mailed on Apr. 2, 2015, by the European Patent Office for Application No. 14187584.9.

* cited by examiner

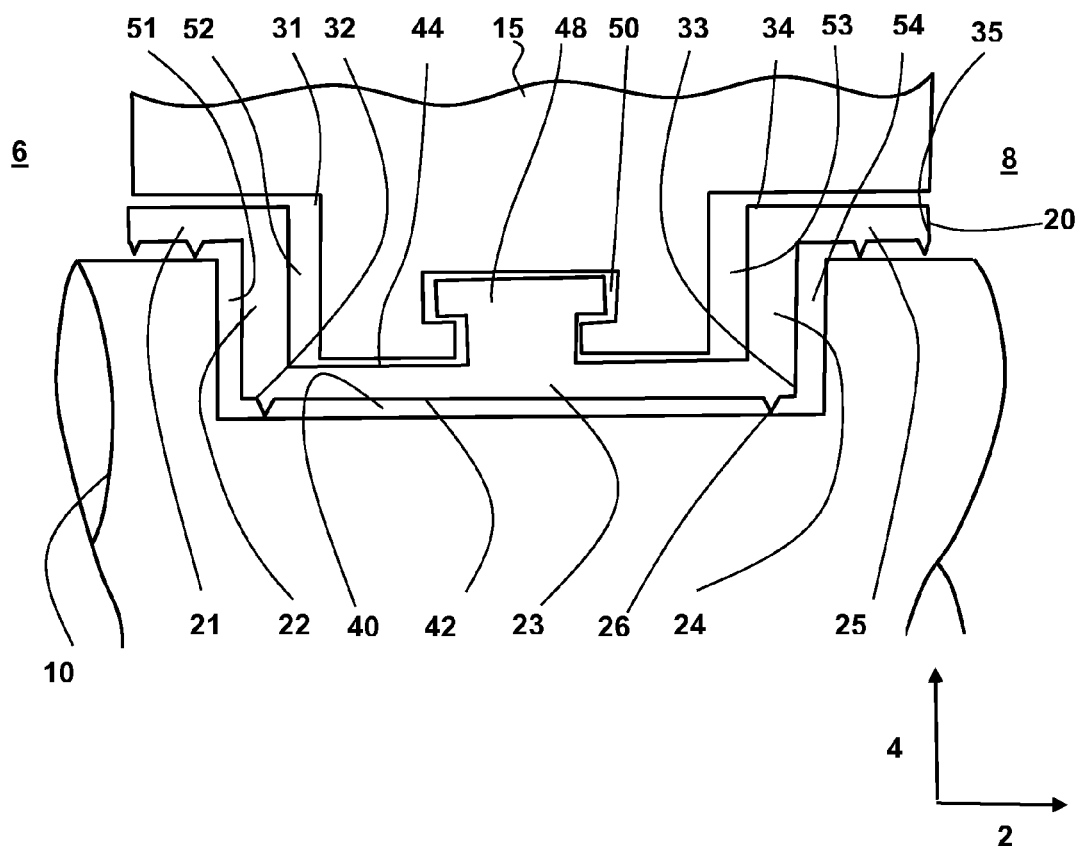

SEAL

TECHNICAL FIELD

The present disclosure generally relates to seal systems for sealing between a moving and a stationary component and more specifically to retractable seal systems.

BACKGROUND INFORMATION

Shaft seals have been known for a long time and are used in steam turbines to seal between rotating components. One common seal is a retractable seal that comprises an arcuate segment with a sealing surface on which labyrinth sealing elements are located and a necked-in portion on a pressure side of the seal segment. The necked-in portion is configured to fit into a T-slot configured in the stationary component. The segments of a segment row are serially disposed in the circumferential direction within their T-slot and arranged so that each segment is resiliently yielding in the radial direction, substantially independently of the adjacent segments, so that when touched under the action of the applied radial thrust it deflects radially and returns into its starting position when the thrust is relieved. This resilient yield is obtained by means of helical springs or leaf springs which are accommodated in recesses of the segments and whose action in the operating state is increased by slots at the rear sides of the segments which allow steam of higher pressure to pass to the rear side of the segments so that these are additionally radial thrust towards the interior.

The necked-in portion further includes an axial facing surface. Axial pressure drop across the gland gives a thrust, and this force is transferred to the stationary component through the axial face. If the gland is required to move radially then friction resulting from the axial thrust can be high. The main benefit of the design is to reduce the axial thrust, thereby reducing the friction on the axial face. This ensures that when the gland is required to move radially, it will be more responsive to the radial forces acting upon it. It is not desirable to remove all friction, as this could result in a gland that "chatters", i.e. small, high frequency, varying forces causing small movements of the gland. A moderate amount of friction will damp these small movements. Therefore, the design needs to control variables that affect friction.

SUMMARY

A sealing segment is provided that reduces the axial thrust on the sealing segment thereby reducing friction.

The disclosure attempts to address this problem by means of the subject matter of the independent claim. Advantageous embodiments are given in the dependent claims.

One general aspect includes a sealing system for sealing between a first component and a second component wherein at least one or either the first component or the second component is a rotating component. The sealing system comprises first component with a circumferential groove that extends into the first component, a sealing segment and the second component. The continuous sealing segment has a first portion having a first ending, extends axially in a downstream direction to the first end. The sealing segment further has a sealing face with a series of sealing elements located between the first component and the sealing segment. A second portion, with a second end, extends radially from the first end into the groove to a second end. The second portion has a sealing face, a third portion, extending axially from the second end in the groove to a third end, having a sealing face with a series of sealing elements located between the first component and the sealing segment, a fourth portion, extending radially out of the groove from the third end a fourth end, having a sealing face, a fifth portion, extending axially in a downstream direction from the fourth end to a fifth end, having a sealing face with a series of sealing elements located between the first component and the sealing segment, and a pressure face, wherein the extension of the second portion, third portion and fourth portion forms a U-shape region in the pressure face that mirrors the shape of the groove. In addition, the second component, which faces the pressure face, extends at least partially into the U-shaped region of the pressure face, wherein the second portion sealing face and the first component form a first region there between, the second portion pressure face and the second component forms a second region there between that is axially opposite the first region, the fourth portion sealing face and the first component form a third gap there between, and the fourth portion pressure face and the second component forms a fourth region there between that is axially opposite the third region.

Further aspects may include one or more of the following features. The third portion further having a necked-in portion extending from the pressure face while the second component comprises a cavity shaped to receive the necked-in portion. The pressure face of the third portion further comprises a necked-in portion extending from the pressure face, while the second component comprises a cavity shaped to receive the necked-in portion therein, wherein the shape of the neck-in portion and the cavity enables moveably mounting of the sealing segment to the second component. The sealing system where the necked-in portion is located half-was between the second region and the third region.

It is a further object of the invention to overcome or at least ameliorate the disadvantages and shortcomings of the prior art or provide a useful alternative.

Other aspects and advantages of the present disclosure will become apparent from the following description, taken in connection with the accompanying drawing which by way of example illustrates an exemplary embodiment of the present invention.

BRIEF DESCRIPTION OF THE DRAWINGS

By way of example, an embodiment of the present disclosure is described more fully hereinafter with reference to the accompanying drawings, in which:

FIG. 1 is a sectional view of a sealing system according to an exemplary embodiment of the disclosure.

DETAILED DESCRIPTION

Exemplary embodiments of the present disclosure are now described with references to the drawings, wherein like reference numerals are used to refer to like elements throughout. In the following description, for purposes of explanation, numerous specific details are set forth to provide a thorough understanding of the disclosure. However, the present disclosure may be practiced without these specific details, and is not limited to the exemplary embodiment disclosed herein.

An exemplary embodiment of a sealing system shown in FIG. 1 includes a rotating component 10, a stationary component 15 and a continuous sealing segment 20 that is located between the rotating component 10 and the stationary component 15 so as to provide a seal gap between the rotating component 10 and the stationary component 15. In this context a continuous sealing segment that is either formed as a single piece of else jointed such that it has the properties of a single piece, wherein two neighbouring components that are not physically fastened or fixed together to fixingly resist relative movement are not considered, in combination, to be a continuous segment.

The rotating component 10 comprises a circumferential groove 40, extending into the rotating component 10, having a depth from a surface of the rotating component 10 as well as sides at axial ends that extend in an essentially radial direction 4. The groove 40 as such is not formed exclusive by sealing elements 16 or features whose primary purpose is to enhance or enable sealing between the rotating component 10 and the stationary component 10 located on the nominal surface of the rotating component 10 but instead is a feature of the rotating component 10 itself. For example, the groove 40 is formed in the surface of the groove 40.

The stationary component 15 extends partially into the groove 40 as one enabler for balancing of axially thrust acting on the seal.

The sealing segment 20 is shaped to fit into the groove 40 between the stationary component and the rotating component and overlap the rotating component 10 at both axial ends of the groove 40. As shown in FIG. 1, this is achieved by the sealing segment 20 having a first portion 21 at an upstream 6 end of sealing segment 20 that extends axially a downstream 8 direction to a first end 31, a second portion 22 radially extends from the first end 31 into the groove 40 to a second end 32, then a third portion 23 axially extends from the second portion 22 in the groove 40 to a third end 33, a fourth portion 24 further radially extends from the third end 33 out of the groove 40 to a fourth end 34, and finally fifth portion 25 axially extending from the fourth end 34 to a fifth end 35.

The sealing segment 20 further has a sealing face 42 that faces the rotating component 10, wherein each of the axially extending portions of the seal segment 20, that is the first portion 21, third portion 23, and fifth portion 25, include sealing elements 26 that extend from the sealing face 42 to the rotating component 10.

The sealing segment 20 further includes a pressure face 44 on the opposite side of the sealing segment 20 to that of the sealing face 42. As a result of the direction of extension of the portions of the sealing segment 20 into and from the groove 40, the pressure face 44 forms a U-shape region that, as can be seen in FIG. 1, that mirrors the shape of the groove 40.

In an exemplary embodiment shown in FIG. 1, a necked-in portion 48 extends from the pressure face 44 into a cavity 50 of the stationary component 15. The purpose of the necked-in portion 48 is to provide a movable mounting for the sealing segment 20 that allows the sealing segment 20 to be either retracted from, or drawn to the rotating component 10 so as either open or close a seal gap between the rotating component 10 and the sealing face 42 of the sealing segment 20. As is known in the art, the necked-in portion 48 may be fitted with springs or other biasing means to bias the location of the sealing segment 20 relative to the stationary component 15.

In an exemplary embodiment the necked-in portion 48 is located half way between the second end 32 and the fourth end 34.

The location of sealing elements 26 and direction of extension of the portions of the sealing segment 20 relative to the rotating component 10 and the stationary component 15 is such that a first region 51 is created between the rotating component 10 and the sealing face 42 of the second portion 22, a second region 52 is created between the stationary component 15 and the pressure face 44 of the second portion 22 that is axially displaced from the first region 51 such that the first region 51 and second region 52 are on axially opposite sides of the sealing segment 20. A third region 53 is created between the stationary component 15 and the pressure face 44 of the fourth portion 24, while a fourth region 54 is created between the rotating component 10 and the sealing face 42 that is axially displaced from the from the first region 51 such that the third region 53 such that the third region 53 and the fourth region 54 are on axially opposite sides of the sealing segment 20. In this arrangement, in operation, the pressure is greater in the second region 52 than in the first region 51 due to pressure losses caused by sealing elements 26 located between the first portion 21 and the rotating component 10. Similarly the pressure in the fourth region 54 is greater than the pressure in the third region 54 due to back pressure caused by sealing element 26 located between the fifth portion 25 and the rotating component 10. Due to the axial displacement of the first region 51 from the second region 52 and the third region 53 from the fourth region 54 axial thrust caused by the pressure in the first region 51 is axially opposed by the pressure in the second region 52 with creating a twisting moment while similarly the pressure in the third region 53 is axially opposed by the pressure in the second region 54 also with creating a twisting moment that could not be achieve if the first and second regions 51, 52 or the third and fourth regions 53,54 had a radially component to their displacement. Nonetheless, by adjusting the relative extensional length of the second portion 22 and the fourth portion 24 and corresponding the extension of the stationary component 15 into the groove relative to the radial extension of the necked-in portion 48 is it possible to adjust the thrust on the sealing segment 20. By further location of sealing elements 26 between the third portion 23 and the rotating component 10, the relative pressure in first region 51 the relative pressure in the first region 51 compared to the second region 52 and the third region 53 compared to the fourth region 54 may be further adjusted, thereby further influence the thrust cancelling ability of the arrangement.

Although the disclosure has been herein shown and described in what is conceived to be the most practical exemplary embodiment the present disclosure can be embodied in other specific forms. For example, the groove 40 may be formed in the stationary component 15 instead of the rotating component 10 as provided in an exemplary embodiment. The presently disclosed embodiments are therefore considered in all respects to be illustrative and not restricted. The scope of the disclosure is indicated by the appended claims rather that the foregoing description and all changes that come within the meaning and range and equivalences thereof are intended to be embraced therein.

REFERENCE NUMBERS

2 Axial direction
4 Radial direction
6 Upstream
8 Downstream
10 Rotating component
15 Stationary component
20 Sealing segment
21 First portion
22 Second portion
23 Third portion
24 Fourth portion
25 Fifth Portion
26 Sealing element
31 First end
32 Second end
33 Third end
34 Fourth end 35 Fifth end
40 Groove
42 Sealing Face
44 Pressure face
48 Necked-in portion
50 Cavity
51 First region
52 Second region
53 Third region
54 Fourth region

The invention claimed is:

1. A sealing system for sealing between a first component and a second component wherein at least one of the first component or the second component is a rotating component, the sealing system comprising:

the first component with a circumferential groove extending into the first component, wherein the second component partially extends radially into the groove;

a continuous sealing segment, between the first component and the second component, partially extending into the groove, comprising:

a first portion, with a first end, the first portion extending axially in a downstream direction to the first end and further having a sealing face with a series of sealing elements located between the first component and the sealing segment;

a second portion, having a second end, the second portion extending radially from the first end into the groove to a second end, having a sealing face;

a third portion, having a third end, the third portion extending axially from the second end in the groove to a third end, having a sealing face with a series of sealing elements located between the first component and the sealing segment;

a fourth portion, extending radially out of the groove from the third end a fourth end, having a sealing face;

a fifth portion, extending axially in a downstream direction from the fourth end to a fifth end, having a sealing face with a series of sealing elements and the sealing segment; and a pressure face, wherein the extension of the second portion, third portion and fourth portion forms a U-shaped region in the pressure face that mirrors the shape of the groove;

the second component which faces the pressure face and extends at least partially into the U-shaped region of the pressure face, wherein:

the second portion sealing face and the first component form a first region therebetween; and the second portion pressure face and the second component form a second region therebetween that is axially opposite the first region;

the fourth portion sealing face and the first component form a third region therebetween; and the fourth portion pressure face and the second component form a fourth region therebetween that is axially opposite the third region.

2. The sealing system of claim 1 wherein the pressure face of the third portion comprises:

a necked-in portion extending from the pressure face, and the second component comprises:

a cavity shaped to receive the necked-in portion, wherein the shape of the necked-in portion and the cavity are configured for moveably mounting of the sealing segment to the second component.

3. The sealing system of claim 2 wherein the necked-in portion is located halfway between the second region and the third region.

\* \* \* \* \*